Figure 1:
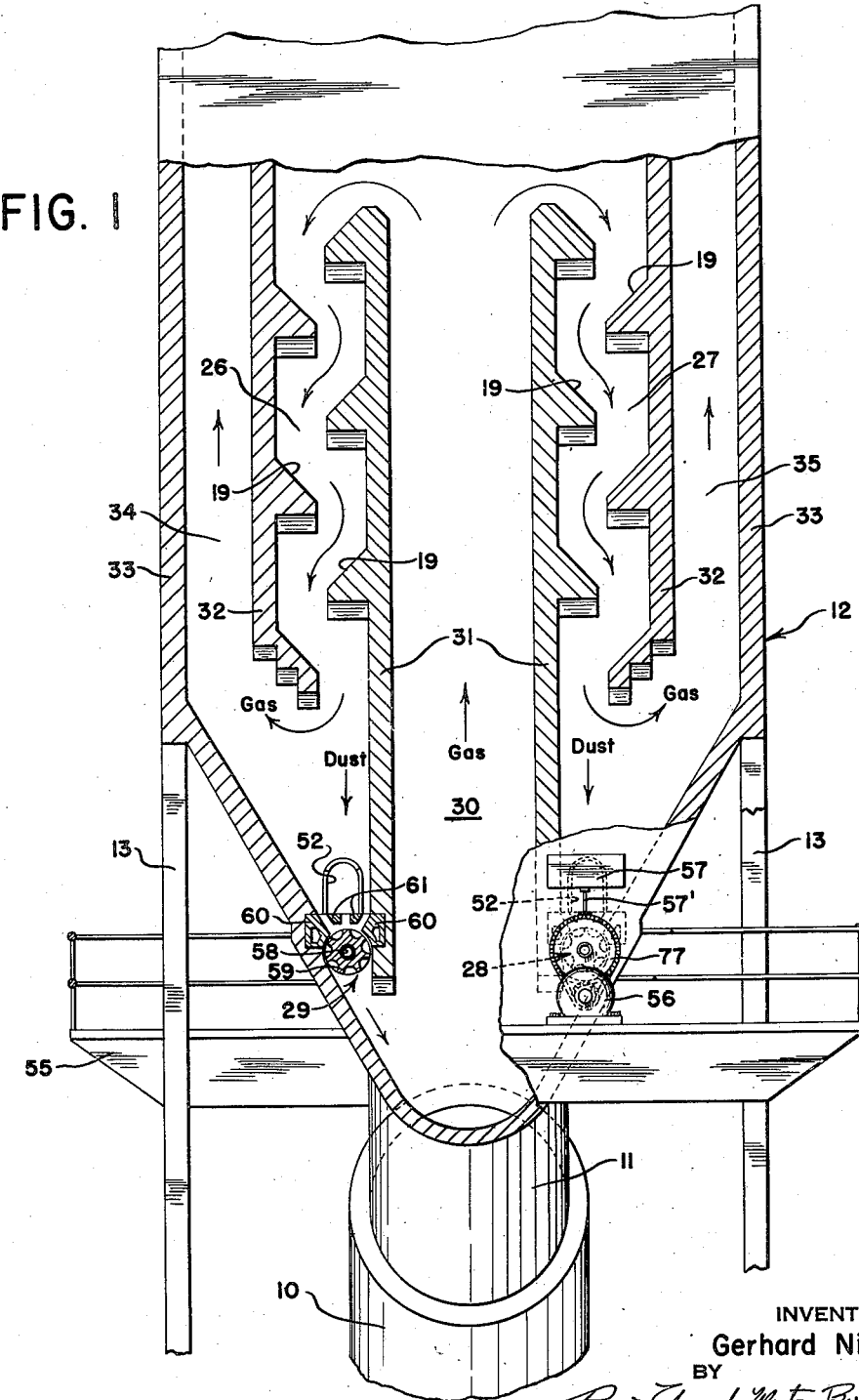

INVENTOR
Gerhard Niemitz
BY
*Pennie, Edmonds, Morton, Barrows & Taylor*
ATTORNEYS

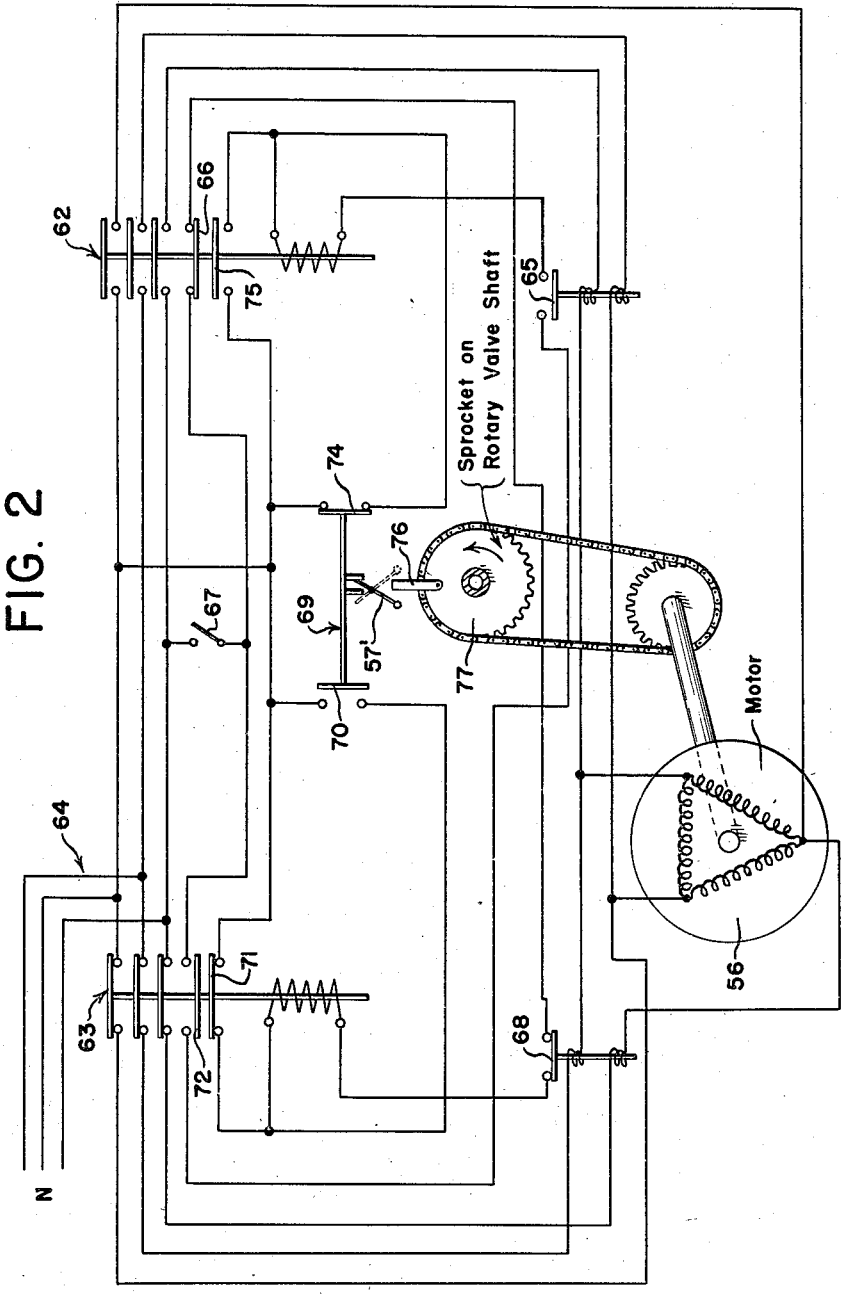

United States Patent Office 2,824,670
Patented Feb. 25, 1958

2,824,670

ROTARY FEED AND DISTRIBUTOR VALVES AND OPERATING MECHANISM THEREFOR

Gerhard Niemitz, Bronx, N. Y., assignor to Kennedy-Van Saun Mfg. & Eng. Corp., New York, N. Y., a corporation of Delaware Original application July 23, 1954, Serial No. 445,305. Divided and this application February 29, 1956, Serial No. 568,592

5 Claims. (Cl. 222—76)

This invention relates to improvements in rotary feed and distributor valves and operating mechanism therefor, more particularly for use in connection with suspension or contact type heat exchangers for preheating dust-like materials, such as the charging stock for cement kilns with the hot gases from the kiln.

The present application is a division of my pending application Ser. No. 445,305, filed July 23, 1954, for "Suspension Type Heat Exchanger and Method of Heating Finely Divided Solids."

The preheater for finely-divided solid materials, as disclosed in said pending application, comprises a tower-type heat exchanger, including a series of chambers provided with baffles over which the fine solid material drops in succession from an elevated feed bin, the finely-divided material passing through a series of air locks or rotary valves downwardly through the tower to the point where it enters the inlet of a cement kiln, for example. In this construction the gas travels in parallel flow with the finely-divided solid material through the series of chambers, at the bottom of each section of which the gas is forced to make a sharp 180° turn, so that most of the dust or solid material is separated therefrom. After leaving one chamber or section, the gas travels upward to the top of the next higher section of the series where its direction of flow is reversed and it again travels in parallel flow downwardly with the fine material being preheated. The intimate contact and separation of highly-heated gas and finely-divided solid is accomplished in each of the series of zones or sections. After the gas leaves the final heat transfer compartment or section, it is conducted through a cyclone type dust collector for the removal of any finely-divided material which may have been carried by the gas stream. These cyclone separators discharge the dust through air locks into a mixing zone where it is mixed with dust previously separated from the gas stream in the first zone of the series, in the direction of solids flow. This mixing compensates for any segregation of solid particles due to difference in sizing in the series of zones, since all material must pass through the same heat transfer sections or compartments.

In this heat exchanger the preheated dust separated out in each zone or section is passed from that section through a rotary feed valve or air lock, constructed according to the invention, into a downwardly-flowing gas stream of higher temperature in the next lower section of the series. The heat exchange tower is advantageously divided into similar parallel sections where parallel streams of hot gases respectively contact separate streams of downwardly-flowing solid particles of material to be preheated. In this construction the two streams of gas are preferably mingled after one or more heat exchange contacts and then divided again into streams for separate individual contacts.

According to the present invention the improved construction includes means for automatically operating the air locks or rotary feed valves to prevent clogging or injury to the equipment. These rotary valves or air locks are protected by a grid against the entry of large pieces of hard material which may accidentally drop from the contact shelves in the heat-exchange zones. These pieces of hard material may, for example, be pieces of fire brick or pieces of condensed alkali or calcined materials being processed. Any smaller pieces which pass through the protecting grid and which may accidentally jam the leading edge of the rotary gate are automatically freed by reversal of the direction of rotation of the rotary gate or lock. This permits the freed piece to drop into the bottom of the gate pocket so that it can be discharged to the next heat-exchange zone or section.

The feed valves and mountings are preferably constructed of high-temperature alloy metals and these structures are protected against excessive heat by forced air cooling, the air for cooling the rotary gate or valve being directed through the center of the rotor. The gates are so constructed that very little gas leakage is encountered, but in any case, there is very little leakage because the draft differential between the succeeding heat-exchange stages or sections is very low. This low differential permits of a very liberal clearance between the gate or valve rotor and the housing thereof.

Electrically-operated means is provided for reversing the direction of rotation of the rotary gates or valves, as described more in detail hereinafter.

The improved apparatus of this invention includes other features and details which are described hereinafter in connection with the accompanying drawings which illustrate one embodiment of the invention. In the drawings:

Fig. 1 is an enlarged broken vertical sectional view of a portion of a heat-exchange tower showing the details of the rotary valve or gate construction; and Fig. 2 is a diagrammatic view including a wiring diagram for the automatic operation of the feed or distributor valves according to the invention.

Referring to Fig. 1, the heat-exchange tower is illustrated in connection with the supply of finely-divided or pulverized dust-like charging stock or raw material to a cement kiln 10 of the rotary type. The inlet end of the kiln 10 is shown directly connected to a feed chute 11 having an arcuate or curved slanting bottom. The feed chute 11 leads into the lower portion of a heat-exchange tower 12 having a steel-work supporting frame including columns 13. While the heat-exchange tower has a steel-work frame, its walls and various structures forming the heat-exchange compartments, passages and gas ducts are made of refractory material.

The tower 12 is generally rectangular in cross-section and provided with a vertical series of heat-transfer chambers provided with horizontal feed valves, so that a wide band of finely-divided material is delivered by each feed valve at a predetermined rate depending upon the rate of rotation of the valves. Fig. 1 shows only the lower portion of the tower in connection with a pair of heat transfer chambers 26 and 27. In each chamber the dust-like material falls on and slides down the sloping surfaces of alternately-arranged shelves or baffles 19 until it reaches the lower end of the chamber where it collects above rotary valves or gates 28 and 29, respectively. These gates or feed valves function to supply finely-divided heated material to the kiln 10 through inlet 11. Similar rotary valves supply material to the chambers 26 and 27 from higher chambers in the tower.

The finely-ground raw material for making cement is heated by direct transfer from the high temperature gases produced from burning the raw material to Portland cement in the kiln 10. These gases at a very high temperature are discharged from the material inlet end of the kiln through the chute 11 of relatively large cross-sectional area directly into a relatively large rectangular-shaped passageway 30, extending transversely of the tower between the heat-exchange compartments or chambers 26 and 27. The passageway 30 is defined by transverse walls 31, at the top of which the high temperature gases from the passageway 30 divide and flow over the walls 31 into the respective chambers 26 and 27 in direct contact with the fine powdered raw material delivered thereinto at the top by rotary distributor valves. The raw material is, therefore, preheated while it is directly in suspension in the high temperature gases, the alternating baffles 19 causing the gases and suspended raw material to change their direction of flow as they move downwardly together through the chambers 26 and 27.

The walls 31 cooperate with opposite walls 32 to define the chambers 26 and 27, respectively, and the walls 32 cooperate with the respective side walls 33 to provide passageways 34 and 35, respectively at opposite sides of the tower for the flow of high temperature gases from the respective chambers 26 and 27. As the high temperature gases in the chambers 26 and 27 reach the lower end of these chambers with their suspended highly-heated raw material, the gases make an abrupt 180° turn around the lower ends of the walls 32 and flow respectively upwardly through the gas passageways 34 and 35 to the top of the walls 32 over which they overflow into and downwardly through the next higher heat-exchange chambers in the tower, constructed like the chambers 26 and 27.

The heat-exchange operation carried out in the tower 12 takes advantage of the parallel flow of high temperature gases and pulverized raw material. This parallel flow takes place in each section of the heat-exchange tower. At the bottom of each section the stream of gas is forced to make a sharp 180° turn, so that most of the dust is separated from the gas stream. From this point the gas travels upwardly to the top of the next heat-exchange section where it again travels in parallel flow with the material to be heated. The heat-exchange sections and the general structure of the tower and its passages are of such a nature that the gas velocity is kept low so that the proportion of dust in the rising gas streams is relatively low. Any dust which is carried up with the gas stream in any instance is returned to the dust or fine raw material traveling downward in the next higher heat-exchange chamber or zone.

Inspection and repair doors 52 are provided at least on one side of the tower directly above the position of each of the rotary distributor valves or gates so that such gates may be inspected or repaired. If the distributor valve or gate 29, for example, should become stopped up or otherwise go out of operation, this would be noticed through the door 52, and the rotary valves directly above could be stopped temporarily so that there would not be an accumulation of raw material above the gate 29, to any great extent. In case of serious difficulty, the flow of raw material to and the flow of gas through the tower may be discontinued for the purpose of making repairs, the hot gases at that time being sent through a bypass leading from the passageway 30 and delivering the hot gases directly into a stack.

In order to facilitate inspection and repair of the rotary valves at various levels in the tower, the tower is provided with platforms 55 which also serve to support the motors and other equipment for operating the rotary distributor valves; one motor 56 and its control 57 are shown in Fig. 1 for operating the rotary valve 28.

Fig. 1 shows the preferred type of construction for the rotary valves and the associated mountings therefor arranged in the refractory brickwork of the tower. All of the rotary valves may be constructed alike as illustrated by the structure shown in Fig. 1 for the rotary valve 29. In this view the motor, as shown, comprises a longitudinal body portion provided with an axial opening 58 through which cooling air is forced by a fan or blower, not shown. The body includes a number of radially-extending blades 59 defining intervening pockets for the reception of finely-divided material to be transferred through the valve structure to the next lower section or to the chute 11 leading to the kiln.

The valve rotor 29 is operatively associated with a metal mounting set in the refractory work of the tower and including hollow transversely-extending spaced side sections 60 having arcuate portions fitting over the upper side portions of the rotor, and downwardly and inwardly-sloping opposite upper surfaces, along which the finely-divided material flows to the rotor. The mounting structure also includes a grid or grating 61 over the opening in the mounting and arranged to catch and exclude large particles from entry to the rotor. Cooling air from the blower referred to, and not shown, is forced through the hollow elements 60 of the mounting to prevent them from softening or melting. All of the metal elements of the rotary valve structure, including the mounting, are made of high temperature alloy metals. When any large particles of material or pieces of firebrick, for example, are found on the gratings or grids 61, they may be raked out through the adjacent door 52. The rotors, such as 29, are provided with hollow end shaft sections, which extend through the refractory side walls of the tower and may be open to the atmosphere at one end and connected to a blower at the other end. The blower or blowers may be located on one or more of the tower platforms 55.

Fig. 2 shows diagrammatically the arrangement for operating the rotary distributor valves, such as 28, 29, etc., this view showing a single unit for operating the motor 56 (Fig. 1) for driving the rotary valve 28, preferably through a clutch and sprocket. The wiring arrangement and relays shown in Fig. 2 may be housed and included in the control 57, having a double-throw contactor arm 57′ operated by a prong on a sprocket. The motor 56 is indicated diagrammatically in connection with its windings, and in association with relays 62 and 63 for connecting the motor to a three-wire current supply 64 for respectively operating the motor in either direction of rotation. The motor 56, with the control shown, will continue to operate in the same direction so long as it does not become overloaded. When a piece of solid material catches between the edge of one of the blades 59 and the mounting 60, the rotor will be stopped and the motor 56 will become overloaded, which will, for example, open an overload switch 65 and de-energize the relay 62, as shown, thereby cutting off the power for rotation of the motor in that direction. As the relay 62 is de-energized, it closes a switch 66, thereby permitting current to flow from one of the current-supply lines 64 through a hand switch 67, the switch 66, an overload switch 68, and the coil of relay 63 through a switch 70 of a double-throw switch unit 69, closed by the motor, to the neutral line of the power supply 64. When the relay 63 is energized, the current-supply leads 64 are connected through the upper three switches of the relay to operate the motor 56 in the opposite direction to the one in which it was previously operated. This will permit any solid piece of material between a rotor blade and the mounting 60 to fall into a cavity of the rotor and thereby be discharged through the rotary valve. The relay 63 also closes a switch 71 which applies a holding current on the relay 63, since the motor, when reversed, will open switch 70 and close a switch 74.

Eventually the overload switch 65 closes, but since it is in series with a now open switch 72 of relay 63, it has no effect on the system. However, if the motor should now become overloaded because of the jamming of the rotary valve 28, for example, the overload switch 68 will open, the relay 63 will be de-energized and relay 62 energized. When the motor 56 was previously reversed, it shifted the double-throw switch unit 69 to open switch 70 and close switch 74. As soon as the relay 62 is energized, the motor is rotated in the opposite direction by current supplied through the upper three switches of the relay 62. As this relay closes, the switch 66 is opened, and a switch 75 is closed to provide a holding circuit on the relay 62 through switches 65 and 72. The switch unit 69 is shifted by an arm 57' which is rocked one way or the other by a spring prong 76 carried by a sprocket 77 mounted on the shaft of the rotary valve 28 and driven by a drive chain from the motor 56.

While the foregoing system is sufficient in most instances for taking care of the reversal of rotation of the rotary valves of the heat-exchange tower installation, modified forms of controls may be provided. For example, a switch may be provided directly in series with the hand switch 67 for interlocking the control with other motors. The overload switches 65 and 68, are shown diagrammatically responsive to overloads in the respective pairs of power-supply lines to the motor. These overload switches are conventional.

It is to be understood that switches 70 and 74 may be shifted by any means actuated by the slowly-rotating sprocket 77, operated by the motor 56, so that the double-throw switch unit 69 is shifted in a direction for later reversing the direction of rotation of the motor. If the motor is stopped by opening the manual switch 67, when under control of relay 63, the double-throw switch unit 69 is in position for closing the switch 74, ready to start the motor operating in the direction controlled by the relay 62.

If the particles supplied to or condensed in the heat-exchange operation are sufficiently large, it is possible that the motor or motors may reverse a number of times during a day's operation. It is to be understood that a control system, such as that shown in Fig. 2, or equivalent thereto, is provided for the motors or other driving or power means for all of the rotary valves of the heat-exchange tower.

I claim:
1. In an apparatus of the type described, a rotary valve type distributor for feeding and distributing finely-divided material, an electric motor for driving said rotary distributor, a pair of similar electric wiring circuits for respectively operating said motor in opposite directions, means responsive to an overload in the circuit in use for shifting the current supply to the motor to the other circuit, a relay in each of said circuits, and means responsive to the rotation of the motor when it is reversed for preparing a circuit for energizing the relay in the motor operating circuit not in use.

2. A rotary valve type distributor, comprising a mounting structure including spaced horizontally-extending side sections having arcuate inner surfaces, a rotor mounted for rotation between said arcuate surfaces and including radially-extending blades defining pockets for receiving finely-divided solid material, said side sections and rotor being hollow for receiving a cooling fluid, said side sections each having a downwardly- and inwardly-sloping surface extending to the upper portion of the rotor for directing finely-divided solid material to the pockets of the rotor, means for rotating the rotor, and means for reversing the direction of rotation of the rotor when rotation of the rotor in one direction is stopped by material entering one of its pockets.

3. A rotary valve type distributor as claimed in claim 2, including a grating extending over the rotor for excluding larger-sized pieces of material from entry into the rotor.

4. An apparatus as claimed in claim 1, characterized in that each relay includes a holding switch, and a holding circuit connected into the holding switch for keeping the relay in energized position when operated.

5. A rotary valve type distributor as claimed in claim 2, characterized in that the means for rotating the rotor includes an electric motor, a pair of similar electric wiring circuits for respectively operating said motor in opposite directions, means responsive to an overload in the circuit in use for shifting the current supply to the motor in the other circuit, a relay in each of said circuits, and means responsive to the rotation of the motor when it is reversed for preparing a circuit for energizing the relay in the motor operating circuit not in use.

References Cited in the file of this patent
UNITED STATES PATENTS

| | | |
|---|---|---|
| 1,558,668 | Carter | Oct. 27, 1925 |
| 2,594,974 | Mylting | Apr. 29, 1952 |
| 2,599,978 | Davis et al. | June 10, 1952 |